Figure 1:
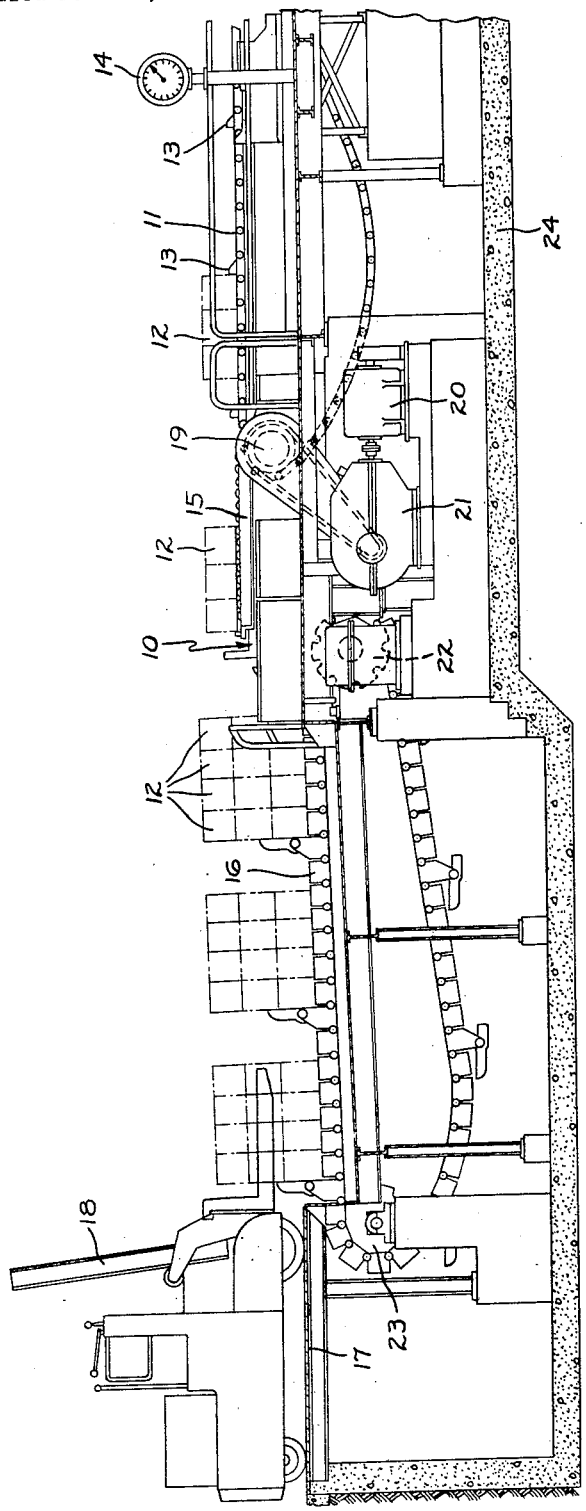

March 26, 1957 W. J. HILL 2,786,588
ARTICLE HANDLING APPARATUS FOR CYLINDRICAL ARTICLES
Filed Dec. 23, 1954 6 Sheets-Sheet 1

INVENTOR.
William J. Hill
BY Norman S. Blodgett
Attorney

INVENTOR.
William J. Hill
BY
Norman S. Blodgett
Attorney

INVENTOR.
William J. Hill
BY Norman S. Blodgett
Attorney

March 26, 1957 W. J. HILL 2,786,588
ARTICLE HANDLING APPARATUS FOR CYLINDRICAL ARTICLES
Filed Dec. 23, 1954 6 Sheets-Sheet 4
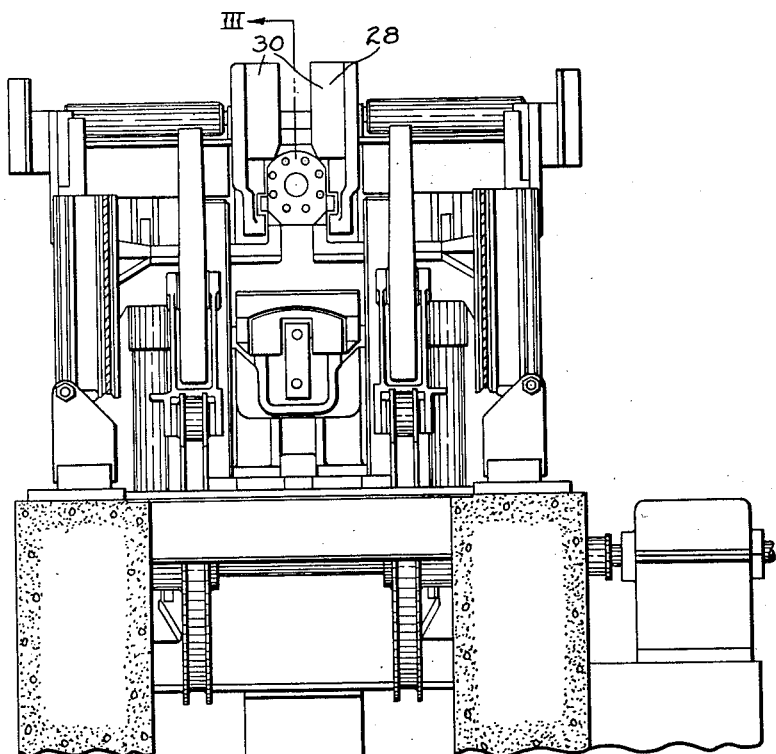
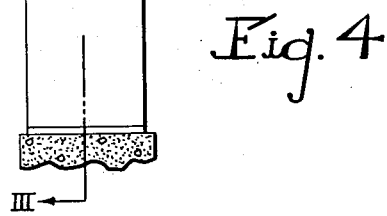
INVENTOR.
William J. Hill
BY
Attorney March 26, 1957 W. J. HILL 2,786,588
ARTICLE HANDLING APPARATUS FOR CYLINDRICAL ARTICLES
Filed Dec. 23, 1954 6 Sheets-Sheet 5
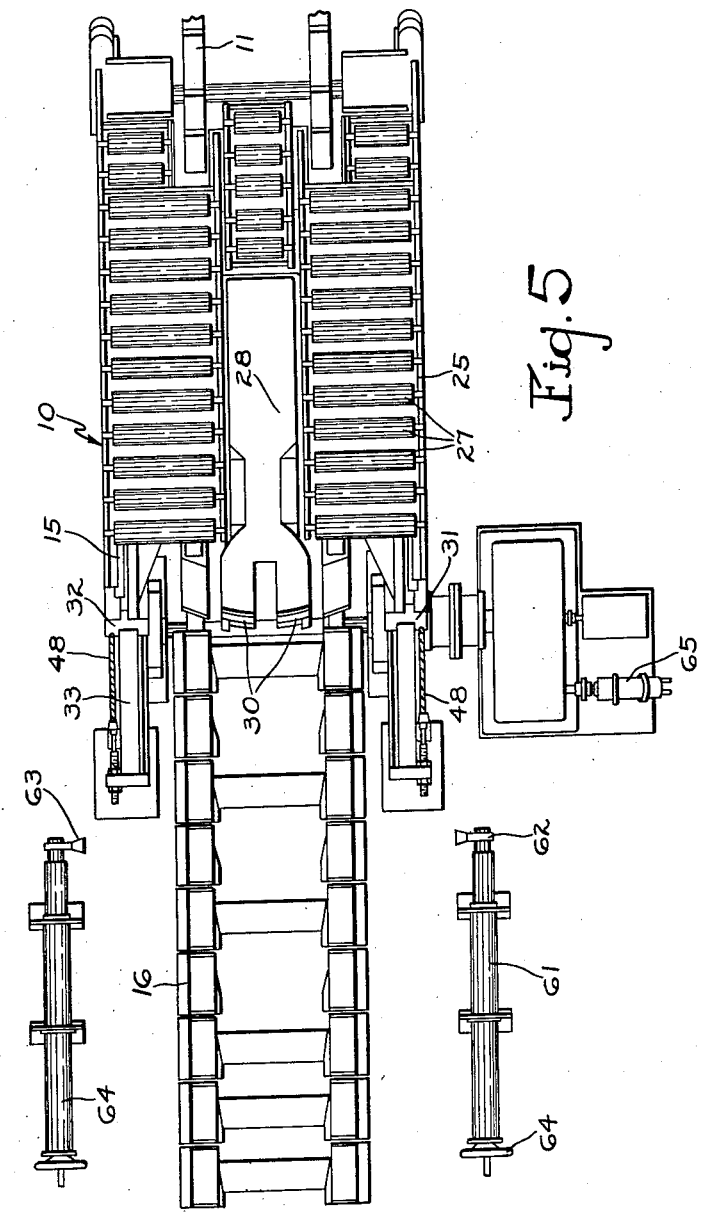
INVENTOR.
William J. Hill
BY Norman S. Blodgett
Attorney March 26, 1957 W. J. HILL 2,786,588
ARTICLE HANDLING APPARATUS FOR CYLINDRICAL ARTICLES
Filed Dec. 23, 1954 6 Sheets-Sheet 6

INVENTOR.
BY William J. Hill
Attorney

United States Patent Office 2,786,588
Patented Mar. 26, 1957

2,786,588

ARTICLE HANDLING APPARATUS FOR CYLINDRICAL ARTICLES

William J. Hill, Worcester, Mass., assignor to Morgan Construction Company, Worcester, Mass., a corporation of Massachusetts Application December 23, 1954, Serial No. 477,301

17 Claims. (Cl. 214—91)

This invention relates to article handling apparatus and more particularly to equipment for changing the orientation of and rearranging heavy circular objects, such as coils of metal strip and the like.

In steel mill operations it is necessary to move annular or disk-like articles, such as coils of strip, from place to place and to change the orientation of their axes. For instance, it is very often necessary to move the coil from a position wherein it is resting on its flat end surface with its axis vertical to a position wherein it is resting on its periphery with its axis horizontal. Such problems arise at the finishing end of a mill for rolling strip. The strip is coiled in a reeling device and may leave the reel lying flat, with its axis vertical. It may be convenient to stand the coil on its edge and to group it with a number of other similar coils. Then, a hairpin hook carrier or a mandrel-type lift truck carries the assembled group to a storage area or the like. Previously-known apparatus of this type has been subject to many disabilities. Often the upending operation, dealing as it does with the acceleration and deceleration of large masses, brings about damage to the coil or to the apparatus. Also, in apparatus of this kind in the past considerable difficulty has been experienced with the coil falling over at the wrong time and with problems of a similar nature brought about by the awkwardness of the coil and extreme variations in the diameter and width thereof. These and other difficulties experienced with the apparatus of the prior art have been obviated by the present invention.

It is therefore an outstanding object of the present invention to provide a novel apparatus for changing the orientation of cylindrical objects.

Another object of the invention is the provision of apparatus for receiving heavy disk-like objects moving consecutively along a conveyor with axes vertical and arranging them continuously in groups with their axes horizontal.

It is a still further object of this invention to provide a coil upender which will stop the motion of a coil along a conveyor, move the coil to upright position, and arrange the coil in a group with other similar coils without disarranging the coil or causing damage thereto.

Another object of the invention is the provision of a coil upender which will rotate a coil about an axis at a right angle to its geometric axis from a position wherein its axis is vertical to a position wherein its axis is horizontal, at the same time causing a translation of the coil horizontally by an amount greatly exceeding the radius of the said rotation.

A further object of the invention is the provision of a coil upender having a shock absorbing means permitting receipt of rapidly moving coils from a conveyor without damage to the coil or apparatus.

It is another object of the invention to provide a coil upender which has no exposed operating parts which may be rendered inoperative by scale and dirt falling thereon.

Another object of this invention is the provision of a coil upender which is particularly adapted to arranging coils in groups with their axes horizontal for conveyance by means of a mandrel-type lift truck or the like.

Figure 2:
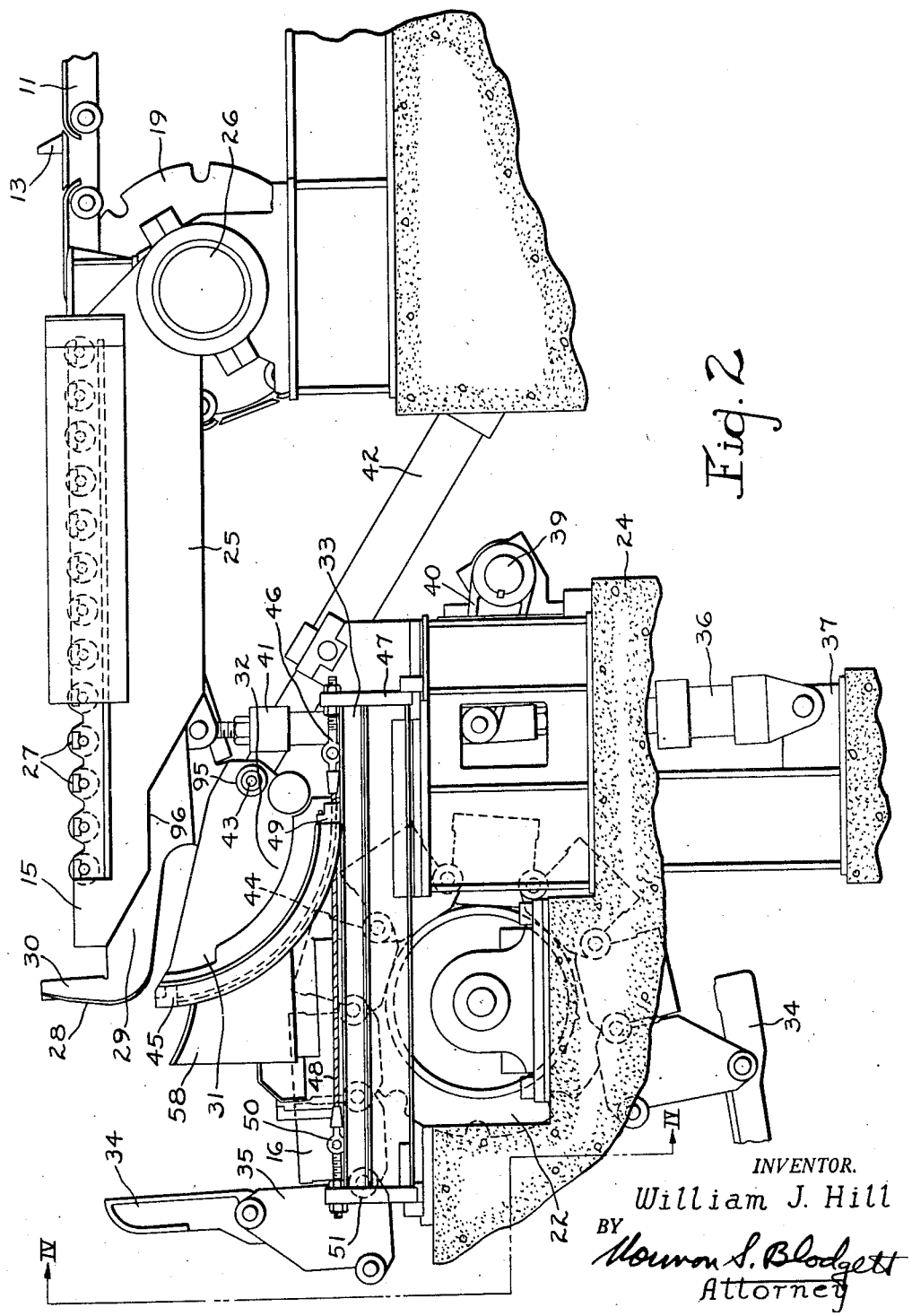
Figure 3:
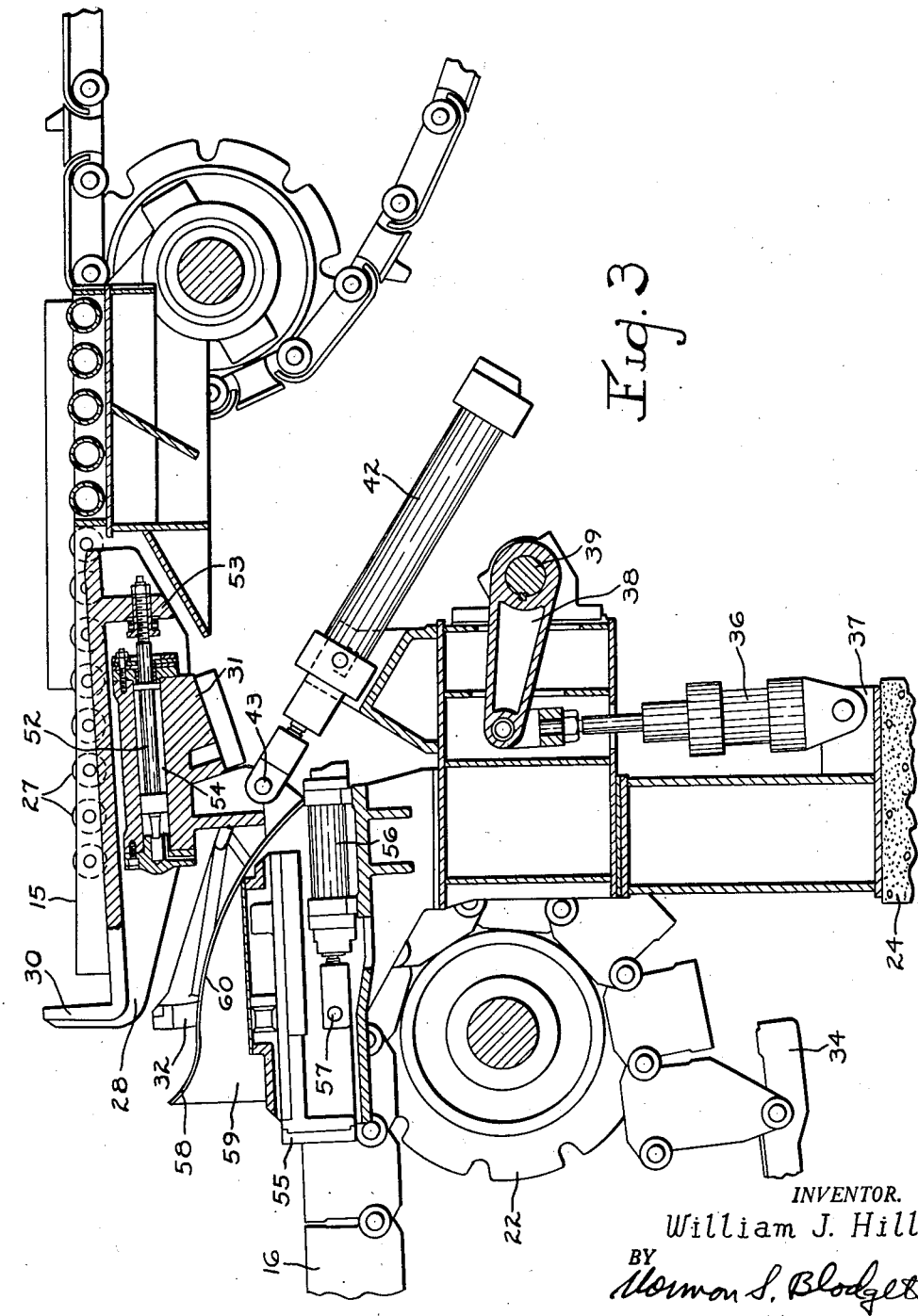
Figure 6:
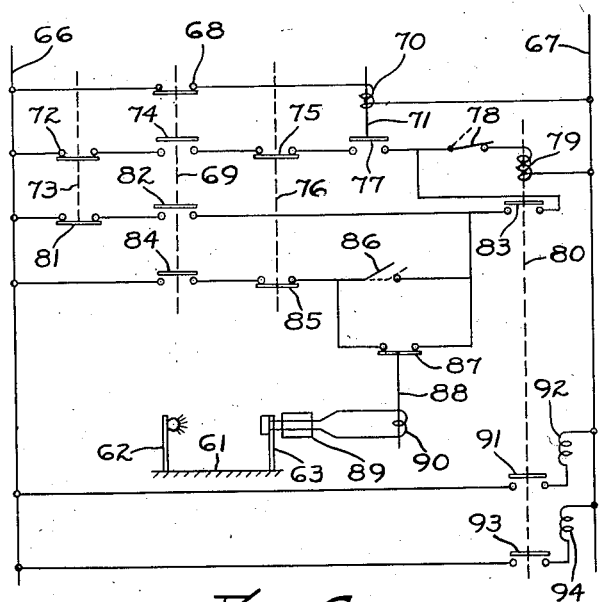
Figure 7:
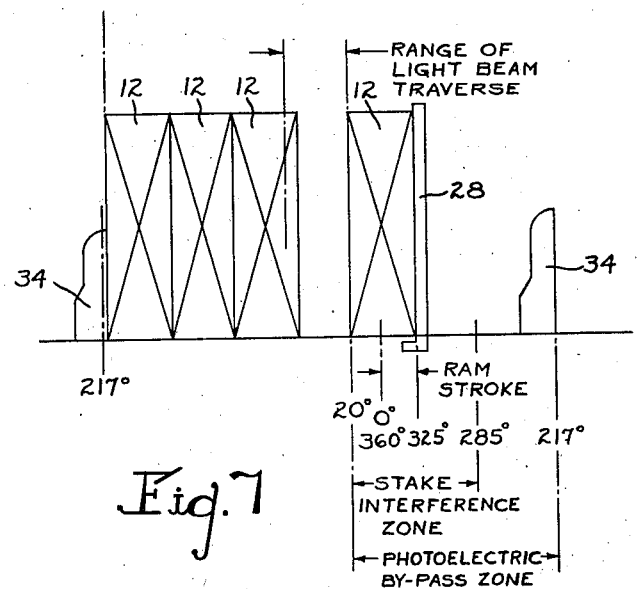

Although the novel features which are believed to be characteristic of this invention will be particularly pointed out in the claims appended hereto, the invention itself, as to its object and advantages, the mode of its operation and the manner of its organization may be better understood by referring to the following description taken in connection with the accompanying drawings, in which:

Figure 1 is a side elevational view of steel mill apparatus embodying the principles of the present invention, Figure 2 is an enlarged side elevational view of a portion of the apparatus shown in Figure 1, Figure 3 is a vertical sectional view of the apparatus shown in Figure 2 taken on the line III—III of Figure 4, Figure 4 is a sectional view taken on the line IV—IV of Figure 2, Figure 5 is a plan view of the apparatus, Figure 6 is a schematic electrical diagram of a portion of the electrical control apparatus associated with the invention, and Figure 7 is a schematic diagram illustrating the operation of a portion of the invention.

Referring first to Figure 1, wherein are best shown the general features of the invention, the article handling apparatus, designated generally by the reference numeral 10, is shown in use with other steel mill apparatus used in the production of strip. The delivery end of an endless chain conveyor 11 is situated at one side of the apparatus 10. The other end of the conveyor passes adjacent to coiling reels, not shown, and receives coils 12 of strip in a flat position, i. e., with their axes vertical. The conveyor 11 is provided with upstanding dogs 13 which serve to push each coil in the direction of motion of the upper flight of the conveyor. The conveyor carries the coil to a weighing station 14 situated in the intermediate part thereof, where each coil is weighed. At the discharge end of the conveyor 11 is situated a coil upender 15 which is followed by an assemblying conveyor 16. The discharge end of the conveyor 16 is situated adjacent a loading platform 17 on which may be maneuvered a mandrel-type lift truck 18 or other apparatus for carrying away a group of bundles. The conveyor 11 is driven at the end adjacent the upender 15 by a sprocket wheel 19 which is in turn driven by an electric motor 20 through a gear reduction unit 21. The conveyor 16 is carried at the end adjacent the upender 15 by a sprocket wheel 22 and at the end adjacent the platform 17 by a sprocket wheel 23. A suitable foundation 24 is provided for the equipment above described.

In Figures 2 and 3 are shown the general features of the upender 15 and the pertinent parts of the assembling conveyor 16. The upender comprises a tilting roller table 25 pivoted to swing about a journal 26, which is aligned axially with the sprocket wheel 19. The table is provided with an anti-friction surface formed by a plurality of rollers 27 which are mounted for rolling about an axis transverse of the direction of movement of the apparatus. The table 25 is provided with an aisle extended inwardly from the end opposite the journal 26, this aisle being most evident in Figure 5 of the drawings. In this aisle is situated a pallet 28 having a main body 29 and upstanding abutments 30. The pallet is mounted independently of the roller table 25 on a cradle 31 having two rocker sections 32 which rest on and roll over a corresponding pair of rails 33. The rocker sections and the rails are on either side of the end of the assembling conveyor 16, the adjacent end of which extends well under the roller table 15. The conveyor 16 is provided with a series of stakes 34 which are fastened at intervals along its length and which are pivotally attached to special links 35 of the conveyor and are constructed to pivot only toward the rear when passing over the upper run of the conveyor.

The roller table 15 can be tilted about the journal 26 through a range from one position in which the plane of the tops of the rollers 27 is horizontal to another position in which the said plane is about three degrees below the horizontal position. The table is operated by a double-acting hydraulic cylinder 36 which is centrally located and which is pivotally attached at one end to an abutment 37 on the foundation 24. The other end of the cylinder is pivotally attached to one end of a crank arm 38 the other end of which is keyed to a transverse shaft 39. At the ends of the shaft 39 are keyed crank arms 40 the other ends of which have pivoted thereto the lower ends of respective pusher rods 41, the upper ends of which are hingedly connected to the opposite sides of the roller table 25. Referring to Figure 2, cradle 31 is operated by a double-acting hydraulic cylinder 42 which is pivotally attached at one end to the foundation and at the other end to the midpoint of a journal 43 extending between the two rocker sections 32. Each rocker section is provided with a holding cable 44 which is fastened at one end to a block 45 at one extremity of the rocker section and which is fastened at the other end to an adjusting means 46 which passes through an abutment 47 at the rearward end of the respective rail 33. Another such cable 48 is fastened at one end to a block 49 at the other extremity of each rocker section and extends to an adjusting means 50 which passes through an abutment 51 extending upwardly from the forward end of each respective rail 33. Each rocker section 32 of the cradle 31 is provided with a cam roller 95 mounted at the outer side in alignment with the journal 43 which is engageable with the lower edge of an apron 96 which extends downwardly from the roller table 15, there being an apron on either side of the cradle.

From Figure 3 it can be seen that the pallet 28 is mounted on the cradle 31 to permit sliding to take place therebetween in a direction that might be best described as along the diameter of a semi-circle of which the rocker sections 32 are segments. In any case, the pallet is capable of linear motion in the plane of the table 15 when the pallet is in its upper position residing in the aisle in the table. This sliding motion is limited by the provison of a piston 52 which is bolted at the rod end to a downwardly-extending flange 53 of the pallet and which slides in a cylindrical bore 54 formed in the bore of the cradle 31. The piston and cylinder bore constitute a shock absorber of a common type for providing a progressive resistance to the sliding motion of the pallet as it moves toward the end of a forward motion.

A packing ram 55 is provided in a position overlying the rearward end of the assembling conveyor 16 and actuated by a double-acting hydraulic cylinder 56, the body of which is fastened to the foundation and the piston rod of which is pivotally attached to the rear of the ram 55 by a journal 57. Embracing the rearward end of the assembling conveyor 16 and lying on opposite sides of the ram 55, are chain guards 58, formed of heavy sheet metal and comprising vertical walls 59 and inwardly-directed flanges 60.

Referring to Figure 5, it can be seen that a photo-cell apparatus 61 is mounted at the sides of the conveyor 16, a light source 62 being located at one side and a receiver 63 being located at the other side. Both portions of the apparatus are mounted on adjusting means 64 which permit the line of interaction to be moved at will along the conveyor. As is evident from this view of the invention, the conveyor 16 is driven by a hydraulic motor 65. Figure 6 illustrates schematically a portion of the electrical controls for the invention particularly associated with the photoelectric apparatus. A source of electrical energy is connected across the lines 66 and 67. Line 66 is connected to one side of a normally-closed contactor 68 of an "off" plunger 69, the other side of which is connected to the line 67 through the coil 70 of a timing relay 71. The line 66 is also connected to one side of a normally-closed contactor 72 of a "hand" plunger 73 the other side of which is connected to one side of a normally-open contactor 74 of the plunger 69. The other side of the contactor 74 is connected to one side of a normally-closed contactor 75 of an "auto" plunger 76 the other side of which is connected to one side of a normally-open contactor 77 of the timing relay 78. The other side of the contactor 77 is connected to one side of a normally-closed safety stop limit switch 78 the other side of which is connected to the line 67 through the coil 79 of a solenoid relay 80. Line 66 is also connected to one side of a normally-closed contactor 81 of the plunger 73 the other side of which is connected to one side of a normally-open contactor 82 of the plunger 69. The other side of the contactor 82 is connected to one side of a normally-open contactor 83 of the relay 80 the other side of which is connected to a point between the contactor 77 and the switch 78. The line 66 is also connected to one side of a normally-open contactor 84 of the plunger 69 the other side of which is connected to one side of a normally-closed contactor 85 of the plunger 76. The other side of the contactor 85 is connected through a rotating limit switch 86 to a point between the contactors 82 and 83. A normally-closed contactor 87 of a photocell-operated relay 88 is connected in parallel with the switch 86. The light source 62 and the receiver 63 of the photocell apparatus 61 are shown and the receiver is connected through the usual amplification apparatus 89 to the coil 90 of the relay 88. The line 66 is connected to the line 67 through a normally-open contactor 91 of the relay 80 and the coil 92 of a coil assembling conveyor solenoid. The line 66 is also connected to the line 67 through a normal-open contactor 93 of the relay 80 and the coil 94 of a bypass valve solenoid.

The operation of the apparatus will now be clearly understood in view of the above description. To begin with, the coils 12 are discharged from the reels onto the coil conveyor 11 and are carried thereby with their axes vertical. Each coil is pushed by a pair of dogs 13 which are pulled along two grooves in the conveyor plate by means of the chain. Each coil eventually arrives at the weighing station 14, where its weight is recorded. Eventually the coils from the conveyor run onto the tilting roller table 25 from which they are lifted by the pallet 28. The tilting roller table is, of course, pivoted at the end which is adjacent the strip coil conveyor and about this pivot it can be tilted through a range, one limit of which is the horizontal position and the other limit of which is about 3° below the horizontal position. The tilting of the roller table is produced by the use of the cylinder 36. The coil when it first advances onto the table 25 has considerable momentum. It coasts over the surface on the rollers 27 until it overlies the pallet 28. Eventually the freely-moving coil strikes the forward abutments 30 of the pallet and is brought to rest. In order that no damage to the abutments or the coil take place, the pallet is slidable over the cradle 31 in the direction of coil movement; however, the pallet and cradle are connected by the shock absorber formed by the piston 52 and the bore 54 in the cradle. The shock absorber is constructed in the usual way to present a considerable increase in resistance at the end of the forward stroke, thus bringing the moving coil and pallet to a smooth stop. The table 25 is then pivoted about its journal 26 to the lower position at approximately 3° below horizontal, so that the coil rests on the pallet. Then, the cylinder 42 is actuated to rock the cradle 31 on its rocker sections 32 until the pallet and coil take up a position that is just short of vertical. As the pallet and cradle rock forward, the cam rollers 95 engage the lower edges of their respective aprons 96 and force the roller table upwardly toward its horizontal position, so that, if perchance the next coil is following closely behind the coil on the pallet and is carried onto the table, the horizontal position of the table will prevent it from picking up speed and striking the raised rearward end of the pallet forcibly. At this position the pallet would be free to slide vertically along the cradle if it were not for the restriction imposed by the piston 52 and the bore 54. Then, the hydraulic pressure is gradually released from the piston-bore combination and the pallet is permitted to move slowly downwardly, carrying the coil with it. The coil is slowly lowered until it contacts the surface of the assembling conveyor 16. The cylinder 56 is then actuated so that the packing ram 55 moves forwardly and contacts the coil. The continued motion of the ram carries the coil from the abutments of the pallet onto a position wherein it is solely supported by the conveyor; the coil is then in a truly vertical position. The ram continues to move the coil forward until it strikes either a pair of stakes 34 or a coil which has been previously moved forwardly. When a sufficient number of coils have been assembled on the conveyor 16 with their axes in line, the conveyor is driven by the hydraulic motor 65 until the next stake 34 is in a proper vertical position. The successive groups of coils are moved along the conveyor and, as each group reaches the platform 17, it is carried away by a means such as the lift truck 18. Each stake 34 is pivotally mounted on an axis above its center of gravity, so that when it passes onto the upper run of the conveyor, it rises into a vertical position. It is so constructed that it is not free to move forwardly of its vertical position, so that it can support a group of coils and prevent them from falling over. As each stake passes over the end of the conveyor sprocket 22 and enters the upper horizontal run it attempts to rise into its vertical position; however, because of the flanges 60 of the guards 58, it is not able to do so, but is held against the conveyor surface until it is past the upender apparatus.

The function of the pallet 28 is twofold. First, with the upender apparatus in the horizontal position, it absorbs the impact of the on-coming coil and provides a controlled rebound. Secondly, with the upender apparatus in the vertical position, it insures that the coil is deposited squarely on the coil assembling conveyor 16 by not lowering the coil onto the conveyor until after the upender apparatus arrives at its vertical position.

Referring to Figures 6 and 7 for the operation of the assembling conveyor and associated apparatus, the operator is provided with a control panel whereby he can operate the "hand," the "off" and the "auto" plungers 73, 69 and 76, respectively. After the pallet 28 deposits a coil on the coil assembling conveyor 16, the coil is pushed by the packing ram 55 sufficiently far to clear the abutments of the pallet. The packing ram stroke also brings the coil into contact either with the conveyor stakes 34 or with the preceding coil, thus interrupting the light beam of the photoelectric apparatus 61. At this point in the cycle, actuation of the "auto" plunger 76 causes the conveyor to run until the light beam is reestablished, or until stopped in conjunction with the rotating limit switch 86. This switch 86 serves to keep the circuit closed and to cause continuous movement of the conveyor during the period from the positions labelled 217° to 20° in Figure 7. During the cycle of operations actuated by the depression of the "auto" plunger, if at the time the light beam is reestablished, the rotating limit switch is between 217° and 20°, a total of 163°, the rotating limit switch causes the conveyor to continue to run to the rotating limit switch 20° position, by which time a new stake will have interrupted the light beam, thus preventing the conveyor from stopping until the stake moves far enough to permit reestablishment of the light beam. By having the rotating limit switch override the photoelectric control at 217°, any one assembly of coils is limited to approximately a 15-ton group of 56" diameter coils. Another function of the rotating limit switch is to prevent the upender from operating when the coil assembling conveyor stakes are in the interference zone, which on the rotating limit switch is from 285° to 20°, a total of 95°, this is because an electrical interlock is provide to prevent the upender from operating while the assembling conveyor is operating.

Various electrical interlocks are provided between the various elements of the apparatus and, although they are not shown in detail, they should be noted for the sake of clarity of presentation of the operation. For instance, means is provided so that the strip coil conveyor 11 may not operate unless the tilting roller table 15 is in its horizontal position. Furthermore, when the strip coil conveyor is running, means is provided so that the tilting roller table cannot be manipulated. Furthermore, means is provided so that the strip coil conveyor 11 can be operated only when the pallet 28 is in its upper horizontal position. These interlocks assure that the roller table and the pallet are in horizontal position during the transfer of the oncoming coil from the strip coil conveyor. When the pallet and cradle are away from the horizontal position, means is provided so that the tilting roller table cannot be operated, which if permitted might allow the table frame to come into contact with the underside of the coil and damage it. When the pallet is horizontal, means is provided to connect the hydraulic circuit associated with the piston 52 and the bore 54 so that it acts as a shock absorber and cushions the impact of the oncoming coil with the abutments 30. When the pallet is between its horizontal and its vertical positions, the connections must be so that the piston and bore are connected neither for cushioning or for lowering. When the pallet is in its vertical position, means is provided to connect the piston and bore hydraulically to lower the coil slowly to the surface of the assembling conveyor 16. Also, the hydraulic circuit for actuating the cylinder 56 of the packing ram 55 is connected so that the ram motion begins only after the pallet and coil have been lowered to deposit the coil on the conveyor 16. An interlock means is provided so that the pallet does not begin its return trip to its horizontal position until the packing ram has been fully extended and has returned to its retracted position. As has been pointed out above, the upender must not be operative when the coil assembling conveyor stakes 34 are in the interference zone, indicated in Figure 7 as occupying the cycle period from 285° to 20° on the rotating limit switch. The track-type limit switch 78 of Figure 6 is located at the end of the conveyor and, when actuated by a coil, serves as a safety stop by causing deenergization of the coil 78 of the solenoid relay 80, which serves to control the conveyor 16, if the safety limit switch 78 stops the conveyor, the conveyor will not restart when the limit switch is reset until restarted by manipulation of the plungers 69, 73, and 76. The rotating limit switch 86 is geared to the coil assembling conveyor so that one revolution of the limit switch corresponds to the stake spacing on the conveyor, which spacing is 9 feet in the preferred embodiment. The 0° position of the limit switch is at the position when the coil contact face of a pair of stakes 34 is aligned with the packing ram in its fully extended position, as indicated in Figure 7.

Other modes of applying the principles of the invention may be employed, changes being made as regards the details described, provided the features stated in the following claims, or the equivalent of such, be employed.

The invention having been thus described, what is claimed as new and desired to secure by Letters Patent is:

1. An article handling apparatus for cylindrical articles comprising: a tilting roller table, a pallet, a cradle mounted for rocking to and fro to an angle approximating a right angle, shock absorbing means associated with the pallet, an assembling conveyor on which the articles are deposited with their axes horizontal, means for driving the assembling conveyor, a coil conveyor mounted adjacent the said table, a packing ram mounted under the cradle, a light source and a photocell receiver arranged to actuate the means for driving the assembling conveyor when a coil has been pushed forwardly by the packing ram, and upright stakes mounted on the assembling conveyor to support the articles.

2. An article handling apparatus for cylindrical articles comprising: a table having a series of rollers defining a broad, generally horizontal surface mounted for tilting about a horizontal axis at its rearward end, means bringing about the tilting movement, a pallet having a flat upper surface and abutments extending upwardly from the forward end thereof, a cradle on which the pallet is mounted having rocker sections whereby it may be rocked through an angle of 90°, means for actuating the rocking movement, an endless chain assembling conveyor having a means for driving it intermittently, an endless chain cradle conveyor having its discharge end adjacent to, and on the level with, the table, means for driving the conveyor, a packing ram mounted under the cradle for horizontal sliding movement over the adjacent end of the assembling conveyor, means for actuating the said sliding movement, a light source and a photocell receiver arranged to actuate the means for driving the assembling conveyor when a coil has been pushed forwardly by the packing ram, and upright stakes hingedly mounted on the assembling conveyor and capable only of pivotal movement rearwardly serving to support the coils.

3. An article handling apparatus for cylindrical articles comprising: a table having a series of rollers defining a groad, generally horizontal surface mounted for tilting about a horizontal axis at its rearward end, means bringing about the tilting movement, a pallet having a flat upper surface and abutments extending upwardly from the forward end thereof, a shock absorber interposed between the table and the pallet, and a cradle on which the pallet is mounted having rocker sections whereby it may be rocked throughout an angle of 90°, and means for actuating the rocking movement.

4. An article handling apparatus for cylindrical articles comprising: an endless chain assembling conveyor having a means for driving it intermittently, the articles being deposited on the conveyor with their axes horizontal, a packing ram mounted for horizontal sliding movement over the adjacent end of the assembling conveyor, means for actuating the said sliding movement, a light source and a photocell receiver arranged to actuate the means for driving the assembling conveyor when a coil has been pushed forwardly by the packing ram, and upright stakes hingedly mounted on the assembling conveyor and capable only of pivotal movement rearwardly serving to support the coils.

5. An article handling apparatus for cylindrical articles comprising: a tilting roller table, means bringing about the tilting movement, a pallet having a flat upper surface and abutments extending upwardly from the forward end thereof, a cradle on which the pallet is mounted having rocker sections whereby it may be rocked through an angle of 90°, means for actuating the rocking movement, an endless chain assembling conveyor having a means for driving it intermittently, an endless chain cradle conveyor having its discharge end adjacent to and on the level with the table, means for driving the conveyor, a packing ram mounted under the cradle for horizontal sliding movement over the adjacent end of the assembling conveyor, means for actuating the said sliding movement, a light source and a photocell receiver arranged to actuate the means for driving the assembling conveyor when a coil has been pushed forwardly by the packing ram, and upright stakes hingedly mounted on the assembling conveyor and capable only of pivotal movement rearwardly serving to support the coils.

6. An article handling apparatus for cylindrical articles comprising: a table having a series of rollers defining a broad, generally horizontal surface mounted for tilting about a horizontal axis at its rearward end, means bringing about the tilting movement, a pallet, a cradle on which the pallet is mounted having rocker sections whereby it may be rocked through an angle of 90°, means for actuating the rocking movement, an endless chain assembling conveyor having a means for driving it intermittently, an endless chain cradle conveyor having its discharge end adjacent to and on the level with the table, means for driving the conveyor, a packing ram mounted under the cradle for horizontal sliding movement over the adjacent end of the assembling conveyor, means for actuating the said sliding movement, a light source and a photocell receiver arranged to actuate the means for driving the assembling conveyor when a coil has been pushed forwardly by the packing ram, and upright stakes hingedly mounted on the assembling conveyor and capable only of pivotal movement rearwardly serving to support the coils.

7. An article handling apparatus for cylindrical articles comprising: a table having a series of rollers defining a broad, generally horizontal surface mounted for tilting about a horizontal axis at its rearward end, means bringing about the tilting movement, a pallet having a flat upper surface and abutments extending upwardly from the forward end thereof, a cradle on which the pallet is mounted having rocker sections whereby it may be rocked through an angle of 90°, means for actuating the rocking movement, an assembling conveyor having a means for driving it intermittently, a cradle conveyor having its discharge end adjacent to and on the level with the table, means for driving the conveyor, a packing ram mounted under the cradle movement relative to the adjacent end of the assembling conveyor, means for actuating the said movement, a light source and a photocell receiver arranged to actuate the means for driving the assembling conveyor when a coil has been pushed forwardly by the packing ram, and upright stakes hingedly mounted on the assembling conveyor and capable only of pivotal movement rearwardly serving to support the coils.

8. An article handling apparatus for cylindrical articles comprising: a table having a series of rollers defining a broad, generally horizontal surface mounted for tilting about a horizontal axis at its rearward end, means bringing about the tilting movement, a pallet having a flat upper surface and abutments extending upwardly from the forward end thereof, a cradle on which the pallet is mounted having rocker sections whereby it may be rocked through an angle of 90°, means for actuating the rocking movement, an endless chain assembling conveyor having a means for driving it intermittently, an endless chain cradle conveyor having its discharge end adjacent to and on the level with the table, means for driving the conveyor, a packing ram mounted under the cradle for horizontal sliding movement over the adjacent end of the assembling conveyor, means for actuating the said sliding movement, an electrical means arranged to actuate the means for driving the assembling conveyor when a coil has been pushed forwardly by the packing ram, and upright stakes hingedly mounted on the assembling conveyor and capable only of pivotal movement rearwardly serving to support the coils.

9. An article handling apparatus for cylindrical articles comprising an assembling conveyor having a means for driving it intermittently, the articles being deposited on the conveyor with their axes horizontal, a packing ram mounted for horizontal sliding movement over the adjacent end of the assembling conveyor, means for actuating the said sliding movement, a light source and a photocell receiver arranged to actuate the means for driving the assembling conveyor when a coil has been pushed forwardly by the packing ram, and upright stakes hingedly mounted on the assembling conveyor and capable only of pivotal movement rearwardly serving to support the coils.

10. An article handling apparatus for cylindrical articles comprising an endless chain assembling conveyor having a means for driving it intermittently, the articles being deposited on the conveyor with their axes horizontal, a packing ram mounted for horizontal sliding movement over the adjacent end of the assembling conveyor, means for actuating the said sliding movement, a light source and a photocell receiver arranged to actuate the means for driving the assembling conveyor when a coil has been pushed forwardly by the packing ram, and upright stakes hingedly mounted on the assembling conveyor serving to support the coils.

11. An article handling apparatus for cylindrical articles comprising: a tilting table, a pallet, a cradle mounted for rocking to and fro to an angle approximating a right angle, shock absorbing means associated with the pallet, an assembling conveyor on which the articles are deposited with their axes horizontal, means for driving the assembling conveyor, a coil conveyor mounted adjacent the said table, a packing ram mounted under the cradle, a light source and a photocell receiver arranged to actuate the means for driving the assembling conveyor when a coil has been pushed forwardly by the packing ram, and upright stakes mounted on the assembling conveyor to support the articles.

12. An article handling apparatus for cylindrical articles comprising: a tilting roller table, a pallet, a cradle mounted for rocking to and fro to an angle approximating a right angle, shock absorbing means associated with the pallet, an assembling conveyor on which the articles are deposited with their axes horizontal, means for driving the assembling conveyor, a coil conveyor mounted adjacent the said table, a packing means mounted under the cradle, a light source and a photocell receiver arranged to actuate the means for driving the assembling conveyor when a coil has been pushed forwardly by the packing means, and upright stakes mounted on the assembling conveyor to support the articles.

13. An article handling apparatus for cylindrical articles comprising: a tilting roller table, a pallet, a cradle mounted for rocking to and fro to an angle approximating a right angle, shock absorbing means associated with the pallet, an assembling conveyor on which the articles are deposited with their axes horizontal, means for driving the assembling conveyor, a coil conveyor mounted adjacent the said table, a packing ram mounted under the cradle, and a light source and a photocell receiver arranged to actuate the means for driving the assembling conveyor when a coil has been pushed forwardly by the packing ram.

14. An article handling apparatus for cylindrical articles comprising: a tilting table, a pallet, a cradle mounted for rocking to and fro to an angle approximating a right angle, shock absorbing means associated with the pallet, an assembling conveyor on which the articles are deposited with their axes horizontal, a coil conveyor mounted adjacent the said table, a packing means mounted under the cradle, and a light source and photocell receiver arranged to actuate the means for driving the assembling conveyor when a coil has been pushed forwardly by the packing means.

15. An article handling apparatus for cylindrical articles comprising: a table having a series of rollers defining a broad, generally horizontal surface mounted for tilting about a horizontal axis extending transversely thereof, means bringing about the tilting movement, a pallet having a flat upper surface and abutments extending upwardly from the forward end thereof, a shock absorber interposed between the table and the pallet, and a cradle on which the pallet is mounted having rocker sections whereby it may be rocked throughout an angle of 90°, means for actuating the rocking movement.

16. An article handling apparatus for cylindrical articles comprising: a table having a series of rollers defining a broad, generally horizontal surface mounted for tilting about a horizontal axis at its rearward end, means bringing about the tilting movement, a pallet having a flat upper surface and abutments extending upwardly from the forward end thereof, a shock absorber associated with the pallet, and a cradle on which the pallet is mounted having rocker sections whereby it may be rocked throughout an angle of 90°, means for actuating the rocking movement.

17. An article handling apparatus for cylindrical articles comprising: a table having a series of rollers defining a broad, generally horizontal surface mounted for tilting about a horizontal axis extending transversely thereof, means bringing about the tilting movement, a pallet having a flat upper surface and abutments extending upwardly from the forward end thereof, a shock absorber associated with the pallet, and a cradle on which the pallet is mounted having rocker sections whereby it may be rocked throughout an angle of 90° and means for actuating the rocking movement.

References Cited in the file of this patent

UNITED STATES PATENTS

| | | |
|---|---|---|
| 1,481,431 | Plumb | Jan. 22, 1924 |
| 2,092,540 | Talbot | Sept. 7, 1937 |
| 2,176,761 | Fisher et al. | Oct. 17, 1939 |
| 2,324,930 | Joa | July 20, 1943 |
| 2,558,503 | Young | June 26, 1951 |
| 2,572,509 | Novick | Oct. 23, 1951 |
| 2,658,630 | Melin | Nov. 10, 1953 |
| 2,659,475 | Archer | Nov. 17, 1953 |
| 2,698,100 | Fried | Dec. 28, 1954 |
| 2,700,332 | Donald | Jan. 25, 1955 |

FOREIGN PATENTS

| | | |
|---|---|---|
| 13,468 | Netherlands | Sept. 15, 1925 |
| 951,996 | France | Apr. 25, 1949 |